March 24, 1953 — G. REUSSNER — 2,632,402
FREE TROLLEY CONVEYER SYSTEM
Filed Sept. 22, 1949 — 5 Sheets-Sheet 1
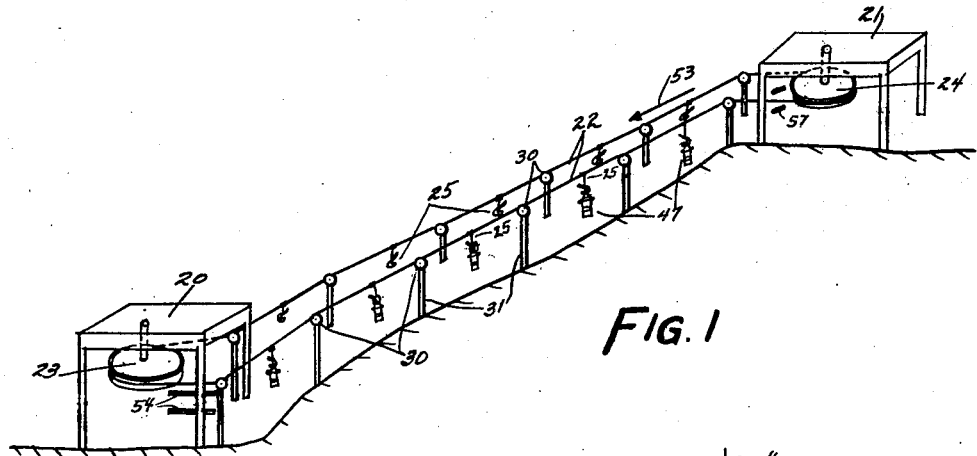
FIG. 1
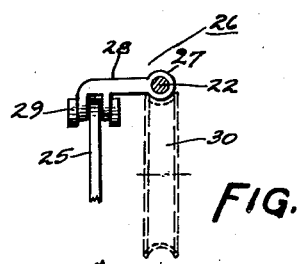
FIG. 4
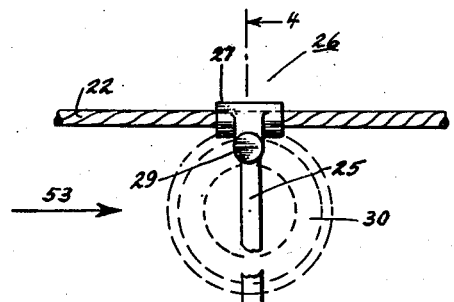
FIG. 3
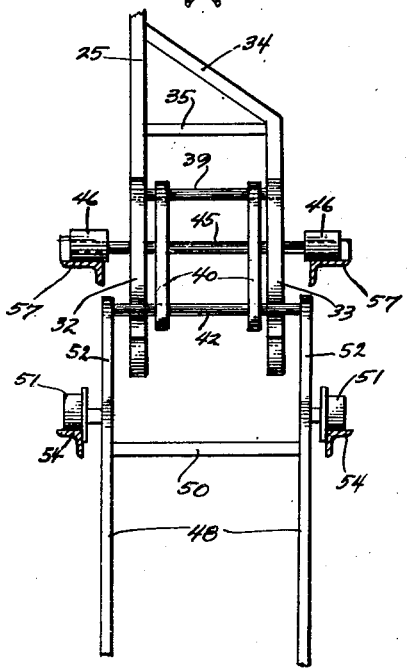
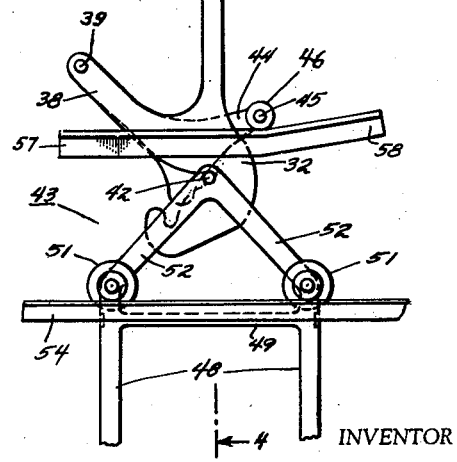
INVENTOR
GEORGES REUSSNER
BY
PATENT AGENT March 24, 1953   G. REUSSNER   2,632,402
FREE TROLLEY CONVEYER SYSTEM
Filed Sept. 22, 1949   5 Sheets-Sheet 2
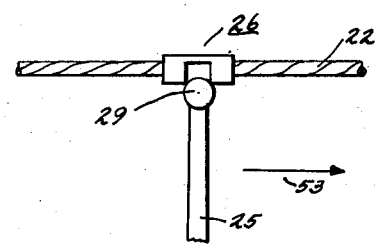
FIG. 2
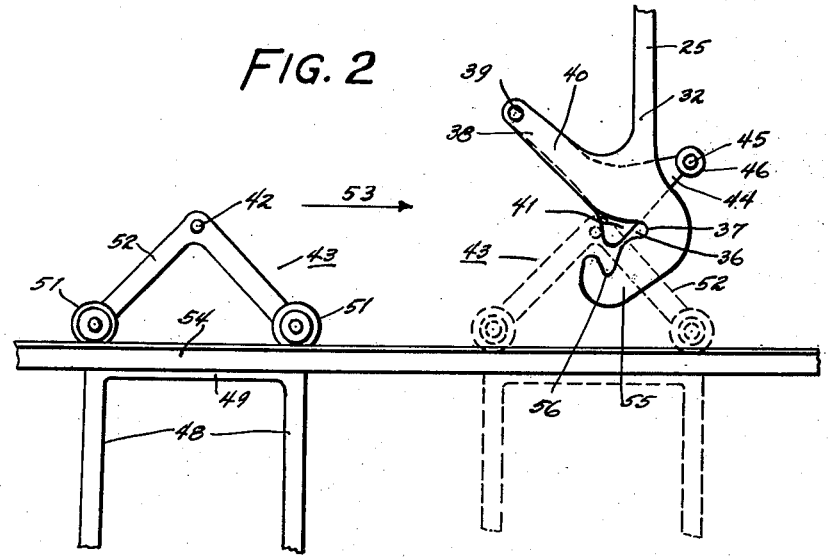
FIG. 5
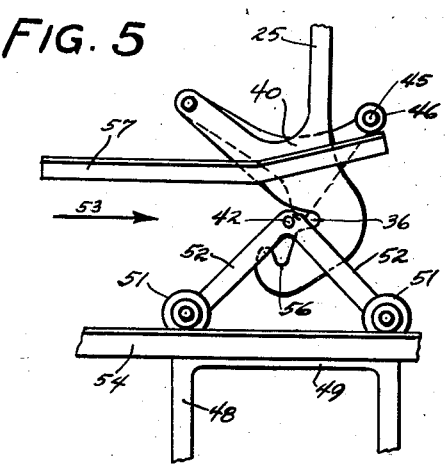
FIG. 6
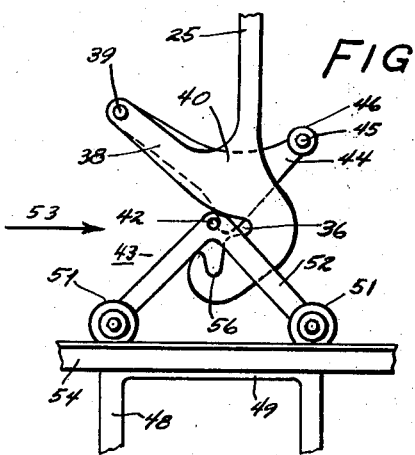
INVENTOR
GEORGES REUSSNER
BY
PATENT AGENT March 24, 1953     G. REUSSNER     2,632,402
FREE TROLLEY CONVEYER SYSTEM Filed Sept. 22, 1949     5 Sheets-Sheet 3

INVENTOR
GEORGES REUSSNER

BY

PATENT AGENT

March 24, 1953 — G. REUSSNER — 2,632,402
FREE TROLLEY CONVEYER SYSTEM
Filed Sept. 22, 1949 — 5 Sheets-Sheet 4

INVENTOR
GEORGES REUSSNER
BY
PATENT AGENT

March 24, 1953 G. REUSSNER 2,632,402
FREE TROLLEY CONVEYER SYSTEM
Filed Sept. 22, 1949 5 Sheets-Sheet 5

INVENTOR
GEORGES REUSSNER
BY
PATENT AGENT

Patented Mar. 24, 1953

2,632,402

UNITED STATES PATENT OFFICE 2,632,402

FREE TROLLEY CONVEYER SYSTEM

Georges Reussner, Megeve, France, assignor to Siegfried Rosenthal, Richmond, Va.

Application September 22, 1949, Serial No. 117,117
In France September 23, 1948

11 Claims. (Cl. 104—173)

This invention relates to a so-called free trolley conveyor stystem, i. e. a system for conveying various types of goods, articles and/or for transporting human beings by means of a continuously running, endless overhead conveyor, such as a cable, chain or the like, whereby free trolleys associated with the actual carriers of the goods, articles or passengers can be coupled with said continuously running cable, chain or the like or detached therefrom at certain places or stations along the path of this conveyor. While the trolleys with their carriers or cars for the goods, articles and for passengers are detached from their common conveyor, these carriers or cars can be loaded without interfering with the normal continuous operation of the whole conveying system. A further advantage of these free trolleys is that they are indepenedent from the common conveyor when detached or separated therefrom, and can be moved on their own tracks to some more or less remote place, such as a loading platform, a garage, repair and maintenance shop, station house, or a station or terminal of another conveyor independent from the first one.

It is an object of the present invention to provide an improved transporting means for servicing the practice of mountaineering, skiing, and similar sports and, more particularly, the transportation of passengers and/or freight to higher levels from which the passengers may descend according to their individual skill and fancy. While the new conveying system is especially adapted for use in the field of sports, it can be generally used as a safe and quick transporting means by any tourist or passenger who wants to ascend to or descend from a mountain or the like in a comfortable manner.

Another object of the invention is the provision of a plurality of automatically acting coupling means spacedly secured to and along the common conveyor of the trolleys, whereby each of said coupling means is adapted to safely and quickly engage and disengage one of the trolleys, running on their own tracks only at the stations of the conveyor system, without producing a noticeable jarring of or dangerous mechanical actions on the trolleys or their associated carriers or cars.

A further object of this invention is the provision of means imparting to the trolleys a slightly higher speed than that of the continuously running endless conveyor at the instant of coupling.

A still further object of the present invention is the provision of inclined tracks or rails at the stations or terminals, on which the trolleys run and by which they obtain a slightly higher speed than that of the conveyor during coupling.

Another important object of the invention is the provision of automatic safety devices, by which the common conveyor will be stopped immediately in case of improper coupling or decoupling.

The main advantage of the new conveying or transporting system is that the common conveyor can continuously run at a relatively high speed, whereas the ski-tow or traction line systems used heretofore as ski-lifts have to operate at a very low speed since the passengers or their seats have to be connected and disconnected with the running conveyor while standing still. For this reason the capacity of the known systems of this type was very limited. Tests have shown that the conveyor in the new system can be driven at a linear speed of 6½ feet per second (equalling approximately 2 meters per second) or more without any difficulties in the automatic operation of the couplings and without jarring of the carriers or cars or any other undesirable or dangerous actions on any part of the system or on the passengers during the engaging or disengaging, because at the moment of coupling or decoupling the speed of the common conveyor does not substantially differ from that of the carrier or car to be coupled or decoupled. It is to be understood that the speed of 6½ feet per second, mentioned in the foregoing, is merely given by way of example and that the new conveyor system may be driven and satisfactorily operated at any other suitable higher or lower speed. Due to the high speed of the conveyor and the safe and quick coupling of the carriers or cars with said conveyor and the decoupling therefrom, the new system is particularly adapted for mass transportation, which has not been possible with the known ski-lift systems.

Other important objects and advantageous features of the invention will be apparent from the following detailed description and drawings, appended thereto, wherein merely for purposes of disclosure herein, non-limitative embodiments of this invention are set forth.

In the drawings:

Fig. 1 is a diagrammatic, perspective view of an embodiment of the conveyor system according to this invention.

Fig. 2 is a side view of a portion of the lower or upper station shown in Fig. 1, illustrating the coupling of the coupling means with a trolley of a carrier.

Fig. 3 is a side view of a portion of the lower and upper station, illustrating the beginning of the decoupling of the coupling means from a trolley at the arrival of a carrier.

Fig. 4 is a section along the lines 4—4 through the portion shown in Fig. 2, some of the elements being illustrated in elevation.

Figs. 5 and 6 are side views of successive intermediate positions of the decoupling of the coupling means from the trolley of Fig. 4.

Figure 7:
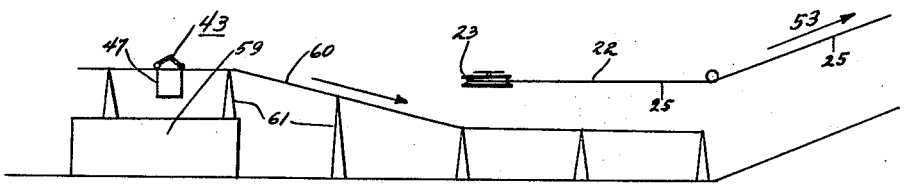
Fig. 7 is a diagrammatic side view of the lower station, indicated in Fig. 1, on an enlarged scale.

In the embodiment of this invention shown in Fig. 1, freight or passengers, such as skiers, can be transported from a lower station 20 to a higher station 21 or vice versa. An endless cable 22 of steel or other suitable material is the conveyor means, actuated in a known manner by one of two driving disks or sheaves 23, 24 located at the lower and upper stations 20 and 21, respectively. Usually, the driving means for the conveyor cable is an electromotor located at the lower station 20. Any other suitable driving means may be used in place of such electromotor. The conveyor cable is continuously driven by said motor or other driving means preferably at the substantially constant linear velocity of 6½ feet per second or more. Any lower linear speed, for example 5 feet per second, may be used for the operation of the conveyor means, whereby, of course, the capacity of the system is considerably decreased.

A number of hanger members 25 are suppported by the cable 22, said hanger members being firmly secured to the cable 22 by means of clip means or clamp units 26 shown in Figs. 2, 3 and 4. The hanger members 25 are spaced along the cable 22 suitably at equal distances (see Fig. 1). Each of the clip means or clamp units 26 includes a clip or clamp 27 attached to the cable, a lateral extension piece or arm 28 at said clip or clamp and a forked hinge joints 29 at the free end of said piece or arm 28. The hanger members 25 are suspended at said joints 29 and can swing about them in a vertical plane parallel with respect to the cable 22. The lateral extension piece or arm 28 is necessary for obtaining a clearance between the hanger members 25 and rollers 30 rotatably mounted on top of posts or pillars 31 supporting and guiding the cable 22 along the whole line (see Fig. 1). The swinging movements of said hanger members 25 are damped by means of friction means which will be hereinafter described, associated with said joints to prevent oscillations as result of vibrations or jolts which may occur in the conveying system. The friction means permit the hanger members 25 to hang substantially perpendicularly under the action of gravity.

The lower portion of each of the hanger members 25 carries a coupling means for a trolley. This coupling means comprises two hook elements 32 and 33, which are substantially parallel to one another. One of said hook elements, i. e. element 32, is an extension of the hanger member 25 while the other, i. e. element 33, is laterally displaced with respect to the first hook element 32 in such a manner that the vertical center line of the cable 22 will always be in the center of gravity of the mass supported by the hanger member 25, assuring the vertical suspension of the two hook elements 32 and 33. These hook elements are interconnected by cross bars or bracings 34 and 35, so that a rigid coupling means is obtained.

As shown in Fig. 2, the hook 32 is provided with a substantially vertical mouth 36 open toward the rear with reference to the moving direction of the conveyor cable 22 and hanger members 25, as indicated by the arrow 53. The walls of the mouth 36 are gradually flaring or widening from a narrow point 37 in its center toward the open side in the rear. An upwardly extending arm 38 obliquely directed toward the rear is integral with the upper part of said hook 32. The hook 33 has exactly the same shape as hook 32 and the end of the arm 38 of the hook 32 is connected with the corresponding arm of the hook 33 by means of a transverse shaft 39 which is substantially horizontal (see Fig. 4). Two identical locking members 40 each having a cam-shaped extension 41 at its lower side are spacedly mounted on the transverse shaft 39 between the hooks 32 and 33 to swing about said shaft 39 and to open or close the mouths 36 of the hooks 32 and 33, whereby a bar 42 carrying a trolley 43 can be locked in said mouths 36 or released therefrom, respectively. Each of the two locking members 40 has an upwardly extending arm 44 obliquely directed toward the front with respect to direction of movement of the cable 22 and the hanger members 25. The outer or free ends of the arms 44 are interconnected by a cross bar 45 passing through said arms at both sides and extending beyond the hooks 32 and 33 (see Fig. 4). Rollers 46 are rotatably mounted on the extremities of said cross bar 45, said rollers 46 rotating in a vertical plane parallel with respect to the direction of movement of the trolleys.

As indicated in Fig. 1, seats 47 carrying the passengers are suspended from the individual hanger members 25. These seats 47 are part of a frame structure including four vertical rods 48 and two pairs of connecting cross bars 49 and 50, shown in Figs. 2, 3 and 4. Four wheels 51 are rotatably mounted on the outsides of the upper ends of said rods 48, the axes of the wheels 51 being perpendicular with respect to the direction of movement of the trolleys, whereby said wheels rotate in a vertical plane parallel with respect to said direction of movement. The upper ends of said rods 48 at each side are joined by two upwardly directed, equal, converging bars 52 forming a triangle with the cross bar 49. The vertices of these two triangles are interconnected by the bar 42 which can be locked in the mouths 36 of the hooks, as mentioned in the foregoing. The locking or coupling can take place only, if the bar 42 carrying the whole trolley 43 with the suspended seat 47 is at the same level as the mouths 36 of the hooks. The frame of the trolley 43 is wider and the bar 42 and the crossbar 50 are longer than the distance between the hooks 32 and 33, so that the bar 42 can properly engage said hooks (see Fig. 4).

Figs. 2, 3 and 4 show the trolley 43 at the lower or upper station 20 or 21, respectively, where said trolley 43 can run on stationary tracks 54, comprising two parallel rails, by means of the trolley wheels 51 engaging said rails. The tracks 54 are mounted at such height that the bar 42 is at the level of the mouths 36. The trolley 43, shown at the left side of Fig. 2 with full lines, is not engaged with the hooks 32 and 33 suspended from the continuously running cable 22 by means of the hanger members 25 and can freely run on the track 54. To start this trolley 43 with its seat and passenger and couple it with the hooks 32 and 33, the trolley 43 is given a push in the direction of movement 53 of the cable 22 in such a manner that the linear speed imparted to said trolley 43 is slightly higher than that of the cable 22 and its suspended hanger members 25 and hooks 32 and 33. As a result of this, the trolley 43 tends to overtake the hooks 32 and 33, traveling in the same direction at a slightly lower linear speed. The representation of the trolley 43 with dotted lines at the right side of Fig. 2 indicates the instant when said trolley 43 has arrived at the hooks 32 and 33 and the bar 42 of the trolley is going to enter the mouths 36 which, however, are closed by the cam-shaped extensions 41 of the locking members 40. The bar 42 pressing against the cam-shaped extensions 41 lifts the locking members 40 which are pivoting about the shaft 39. The bar 42 can now enter the mouths thus opened. After the bar 42 has entered the mouths 36, the locking members 40 immediately move downwards under the action of gravity and the cam-shaped extensions 41 safely lock the bar 42 in the mouths 36, as shown in Fig. 3. The trolley 43 is now taken along by the hanger member 25 suspended from the running cable 22 and lifted from the track 54 at its end or even before said end, if the cable 22 ascends before the end of said track 54. It is an essential feature of this invention that the cam-shaped extensions 41 of the locking members 40 have such ingeniously designed profile that a self-locking action is obtained as soon as the bar 42 enters the tapered front ends of the mouths 36.

An important safety feature of the coupling means is the provision of a safety hook 55 having a vertically directed mouth 56 open at the top, said hook forming a lower extension of each of the main hooks 32 and 33 (see Fig. 2). If for any reason the bar 42 should become disengaged from the mouths 36, it will slide into the lower mouths 56 and will be positively locked therein by means of the cam-shaped extensions 41 of the locking members 40.

In addition to the tracks 54, rails 57 are stationarily mounted at the lower and upper stations, at places, where the trolleys 43 suspended from the cable 22 arrive and shall be disengaged from the hooks 32 and 33 (see Figs. 3 and 4). At each station there are provided two of these rails 57, one at each side of the incoming trolleys 43 at such height and distance from one another that they can be properly engaged by the rollers 46 of the locking members 40 of the trolleys 43. The rails 57 end in ascending portions 58. When a moving trolley 43 suspended from the hooks 32 and 33 arrives at the station, the wheels 51 will engage their track 54 and will run on them relieving the tension in the hanger member 25. The rollers 46 of the locking members 40 of this trolley 43 will then roll on the rails 57 and will be lifted when running over their ascending portions 58. As shown in Fig. 5, the lifting of the locking members 40 results in an opening of the mouths 36 and a freeing of the bar 42 in said mouths 36. The trolley 43 running on its track 54 now slows down and completely disengages from the hooks 32 and 33, as said trolley 43 is no longer taken along by the moving cable 22 (see Fig. 6). The mouths 36 of the hooks 32 and 33 are closed, after the bar 42 has become disengaged and left behind and the rollers 45 have run off the ascending end portions 58 of the rails 57. Eventually the trolley 43 freely running on its track 54 is stopped.

Figure 8:
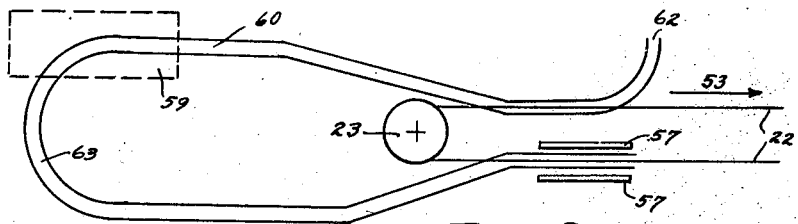
Fig. 8 is a top view of the lower station shown in Fig. 7.

The trolleys 43 can be started either by hand, in which case an operator or attendant pushes the successive trolleys manually, or by means of a small auxiliary driving mechanism, such as an endless chain, or in any other suitable manner. An example of a starting means of the trolleys at the lower station, using gravity as the starting energy, is diagrammatically illustrated in Figs. 7 and 8. The passengers are on an elevated platform 59 to take their seats 47 associated with the free trolleys 43 standing still and being supported on the stationary track 60. This track 60 mounted on pillars or posts 61 is sloping toward the end of the ascending cable 22 and the disk or sheave 23 over which the cable runs. Actually a horizontal end of the track 60 at this place lies under the cable 22, whereby the distance between the track 60 and the cable 22 is such that a proper coupling of the trolleys 43 on said track with the couplings associated with the hanger members 25 suspended from the cable is assured. The trolleys 43, after being loaded, are rolling down the track 60, the slope of which is such that the linear speed gained by said trolleys while rolling on said track becomes slightly higher than the constant linear velocity of the cable 22 so that the trolleys 43 tend to overtake the hanger members 25 which they are trailing. The coupling of the trolleys 43 with the couplings on said hanger members 25 will take place as described in the foregoing. As shown in Fig. 8, the track 60 ends in curved side track 62 adapted to safely receive and stop any trolley 43 which for any reason may not become engaged with the couplings of the hanger members 25. Thus, such trolley is automatically removed from the row of successive trolleys 43.

The trolleys 43 are disengaged at the upper station as described in the foregoing and can be returned empty or full to the lower station after the trolleys 43 have become engaged with the couplings of the hanger member 25 suspended from the descending part of the cable 22 in principally the same manner as just described for the ascending travel. When the trolleys 43 arrive at the lower station, they are automatically disengaged from the couplings associated with hanger members 25 by means of the rails 57 located at the beginning and both sides of the track 60 (see Fig. 8), as the rollers 45 of the couplings contact said rails 57, whereby the mouths 36 of said couplings is opened to free the trolleys 43. The track 60 forms a loop 63 connecting the place of arrival under the descending part of the cable 22 with the place of start under the ascending part of said cable 22, as shown in Fig. 8. The infoming trolleys 43 after being disengaged can be moved either manually or by power driving means, such as an endless chain, or by gravity on the track 62 through said loop 63 to the loading platform 59.

Figure 9:
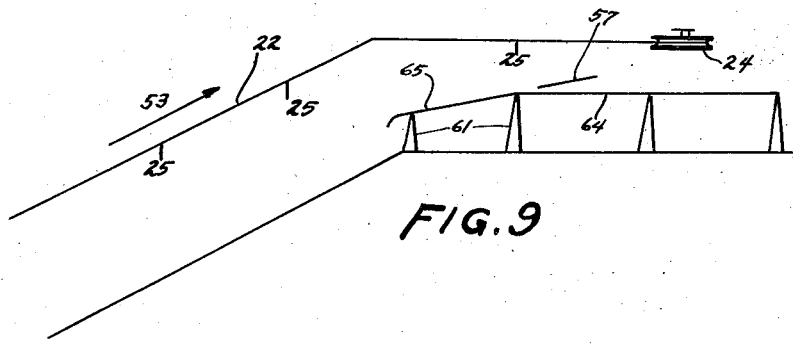
Fig. 9 is a diagrammatic side view of the upper station, indicated in Fig. 1, on an enlarged scale.
Figure 10:
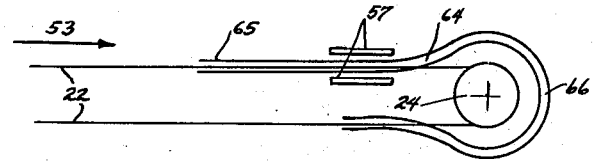
Fig. 10 is a top view of the upper station shown in Fig. 9.

Figs. 9 and 10 illustrate a similar station at the upper end of the cable line. The track 64 for the trolleys 43 begins under the ascending part of the cable 22 with a slanting track portion 65 enabling a smooth engagement with the wheels 51 of the trolleys 43. When the ascending trolleys 43 have just passed said slanting track portion 65, the rollers 46 of the couplings associated with the hanger members 25 will engage the stationary rails 57 mounted at this location, i. e. shortly before a track loop 66. The trolleys 43 will now be decoupled, as it was described before. The track loop 66 goes around the disk or sheave 24 of the cable 22 to the starting place for the descending travel.

Figures 11, 12:
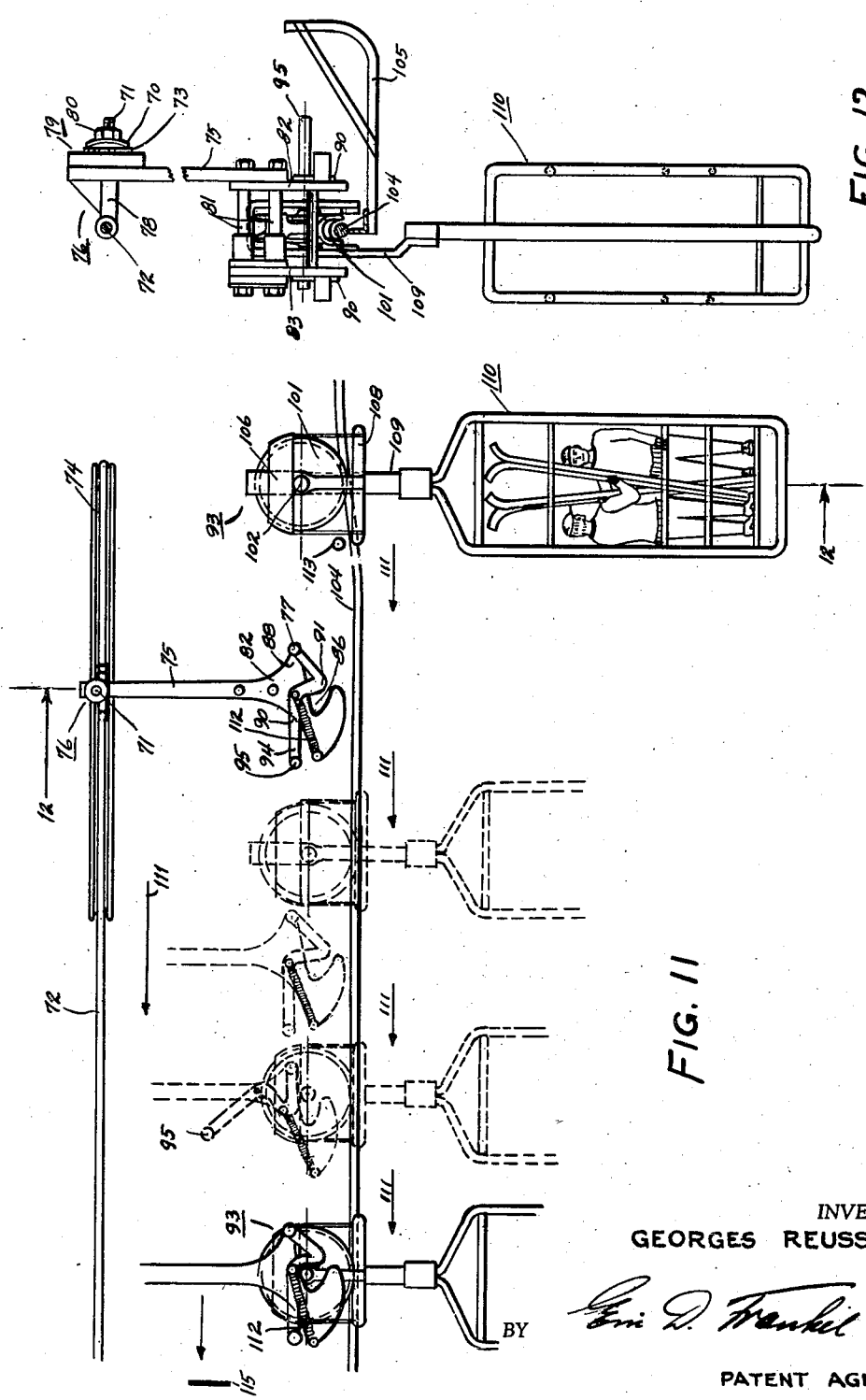
Fig. 11 is a side view of a modified embodiment of the trolley system according to this invention, showing an end station of said system with one car leaving.
Fig. 12 is a section along the line 12—12 through Fig. 11, some of the elements being illustrated in elevation.
Figure 13:
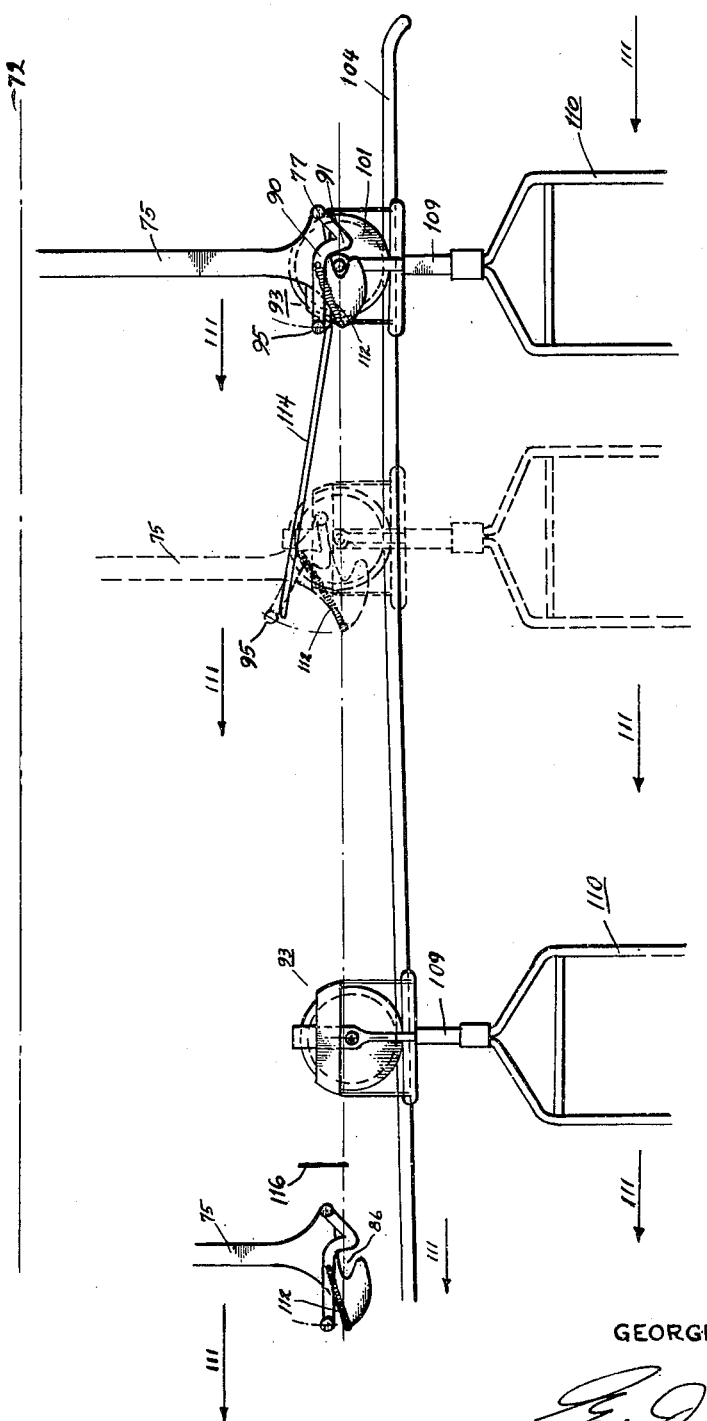
Fig. 13 is a side view of another station of the trolley system of Figs. 11 and 12, illustrating the arrival of one car.

While the trolley shown in the foregoing figures has four wheels running on a two rail track, it is possible to equip the trolley with more or less than four wheels. The trolley illustrated in the modified and simplified embodiment of Figs. 11, 12 and 13 is supported by a single wheel running on a single rail track. In these figures, clip or clamp units 76 are mounted on an endless cable 72, suitably spaced at equal distances, said cable running on a disk or sheave 74 (see Fig. 11) at the one terminal of the cable line and another disk or sheave, not shown in the drawings, at the opposite terminal. Each of these clamp or clip units 76 has an extension piece or arm 78 and a hinge joint 79 supporting a hanger 75. This hanger 75 is hingedly mounted on the free end of said extension piece or arm 78 by means of a bolt 71. A springy disk 70 and a plate 73 of friction material are inserted between a nut 80 on the free end of the bolt 71 and the hanger 75 to damp the swinging movements of said hanger. The pressure exerted by said spring disk 70 and controlling the damping action can be adjusted by said nut 80. The coupling member for the trolley is secured to the lower end of the hanger 75 by means of two bolt means 81 mounting one hook 82 directly on the hanger 75 and holding a second equal hook 83 firmly at a distance from said first hook 82. The shape of these hooks 82 and 83 having mouths 86 is generally the same as that of the hooks 32 and 33 in Figs. 2 to 6, inclusive, though the hooks 82 and 83 have no lower extensions with additional or safety mouths as those in Figs. 2 to 6, inclusive.

Locking members 90 are pivotally mounted on the outside of arms 88, rearwardly extending from each of the two hooks 82 and 83, by means of bolts 77. The two locking members 90 are identical and their lower sides have cam-shaped extensions 91 adapted to close the mouths 86 in principally the same manner as in the couplings of Figs. 2 to 6, inclusive. The front end of each of the locking members 90 is an arm 94. The free ends of these arms 94 are interconnected by a cross bar 95 which passes through at least one said arms 94 and extends beyond at least one of said hooks 82 and 83.

The trolley 93 in the present embodiment has a single wheel 101 with a grooved periphery adapted to run on one stationary rail 104 of suitably round cross section. This rail may be secured to a wall or post by means of a bracket 105. The wheel 101 is rotatably mounted on a shaft 102. This shaft 102 is joined to a frame construction 106 forming an open casing or enclosure holding the wheel 101, the lower portion of said open casing or enclosure including guides 108 on both sides of the rail 104 preventing the wheel from leaving the rail 104. The ends of the shaft 102 extend on both sides beyond the casing or enclosure 106. A bar 109 connects one side of the casing or enclosure 106 with a suspended cab 110, which has a simple frame construction, adapted to accommodate two standing passengers with sport equipment, such as skis. As illustrated in Fig. 12, the hanger 75, the coupling, the trolley 93 and the car 110 are constructed symmetrically in such a manner that a vertical plane through the cable 72 goes through the center of this whole assemblage.

The operation of the coupling shown in Figs. 11, 12 and 13 is principally the same as that in the embodiments of Figs. 2 to 6, inclusive. The free trolley 93 and cab 110 at the right side of Fig. 11, after being released, roll down on the inclined rail 104 in the direction of the arrow 111. As the linear speed of the trolley, gained on said incline, becomes slightly higher than the linear speed of the hanger 75 driven by the cable 72 and moving in the same direction, the trolley will meet the coupling associated with said hanger and the free ends of the shaft 102 of the trolley wheel 101, extending on both sides beyond the casing or enclosure 106, will open and enter the mouths 86 of the hooks 82 and 83. Two successive phases of this coupling operation are indicated with dotted lines in Fig. 11. Finally, the coupling is completed and the mouths 86 are closed holding the shaft 102 safely locked therein. This condition is illustrated at the left side of Fig. 11 with full lines. To assure a safe operation, the pivoting locking members 90 are positively urged to close the mouths 86 under the action of at least one tension spring 112 which may be provided on either or both sides of the couplings between the hooks 82 and/or 83 and the locking members 90.

The free trolleys 93 can be manually released by an operator or attendant, after the passengers have boarded the cars 110 by removing a simple stop member which is diagrammatically indicated in Fig. 11 by a rod 113 in front of the trolley 93 standing still. Another such stop member may be provided likewise in front of said trolley 93 standing still. The latter stop member is automatically withdrawn, when the hanger 75 reaches the position in which is illustrated at the right side of Fig. 11 with full lines. This assures the proper distance of the trolley 93 from the hanger 75 when the trolley starts to roll down the incline to be coupled with said hanger. The simple mechanism which is actuated by the hanger 75 itself when it has reached the described position, to withdraw the second stop member in front of the trolley 93 is not shown in the drawing.

When the suspended trolley 93 together with the car 110 has reached the terminal at the end of the line, it is decoupled in principally the same manner as the trolley 43 in Figs. 2 to 6, inclusive. The trolley 93 suspended from the hanger 75 at the right side of Fig. 13 has just reached a stationary, inclined rail or bar 114 and the free end of the cross bar 95 associated with the locking members 90 has engaged the front end of said rail or bar 114. The trolley 93, indicated with dotted lines in the same figure, is shown at the instant, when the rail or bar 114 has completely opened the mouths 86 and is releasing the trolley 93 which subsequently will slow down. The free trolley 93 and the empty hanger 75 are shown with full lines at the left side of Fig. 13. The mouths 86 of the coupling have been automatically closed under the action of the spring or springs 112. If the cross bar 95 has free ends extending on both sides, inclined rails or bars 114 may be provided at both sides of the cable 72 so that both ends of the cross bar 95 will be engaged at the terminal to decouple the trolleys 93, Although the construction of the new device, particularly of the automatic coupling mechanism, assures its proper and safe operation as a result of the self-locking action of the coupling and the symmetrical construction of the transporting units, a special safety device may be provided which stops the driving motor of the endless cable. An abutment 115 is provided at the left side of Fig. 11 at the level of the cross bar 95 of the coupling, when the mouths 86 are in open position. If now for any reason the coupling should not entirely close after the trolley 93 has entered the mouths 86, the end of the cross bar 95 will strike said abutment 115 which is associated with an electrical switch, not shown, causing the driving motor of the whole system to stop. A similar abutment 116 is provided at the left side of Fig. 13, at the level of the cross bar 95 of the coupling, when the mouths 86 are in closed position. In this case, the abutment 116 will be engaged by the end of the cross bar 95, if the coupling should not properly open to release the trolley 93. The abutment 116 is likewise associated with an electrical switch, not shown, causing the driving motor of the cable to stop when actuated.

Without further description it is thought that the features and advantages of the invention will be readily apparent to those skilled in the art, and it will be understood that changes in the form, proportion and construction of the new conveyor system may be resorted to, without departing from the spirit of the invention and the scope of the appended claims.

I claim:

1. In an overhead conveyor system, a continuous moving overhead conveying means, at least one hook member suspended from said conveying means and having at its lower end a substantially C-shaped coupling means with an opening accessible in the longitudinal direction of said conveying means, stationary track means positioned at points in the travel of said hook member, at least one free trolley unit, roller means on said trolley unit to support it on said track means, engaging means on said trolley unit adapted to enter said opening, when said trolley unit is moving on said track member in the path of said hook member to engage in said C-shaped coupling means to be coupled therewith and suspended from said hook member, a locking member displaceably mounted on said hook member and biased to normally overlap and lock said opening and being adapted to be displaced by engagement with said engaging means when the latter strikes against said locking member to enter said C-shaped coupling means to become coupled therewith.

2. In an overhead conveyor system according to claim 1, wherein said locking member is weighted to bias the same to close said opening.

3. In an overhead conveyor system according to claim 1, wherein a tension spring is attached with one of its ends to said locking member, while its other end is secured to said hook member to bias said locking member to close said opening.

4. In an overhead conveyor system according to claim 1, wherein said locking member is provided with a laterally extending arm, and wherein stationary abutment means are mounted in the path of said arms at said points to strike said arm and thereby trip said locking means to open said opening and permit decoupling of said engaging means.

5. In an overhead conveyor system according to claim 1, wherein said track means are inclined to accelerate said trolley unit so that it will assume about the speed of the overhead conveyor when said trolley unit rolls freely on said track means.

6. In an overhead conveyor system according to claim 1, wherein said locking member is a lever pivotally mounted on said hook member.

7. In an overhead conveyor system according to claim 6, wherein said lever has a cam surface at the place of engagement with said engaging means adapted to wedge the latter to assure its locked position within said C-shaped coupling means.

8. In an overhead conveyor system, comprising a power driven, continuously moving, overhead conveying means, at least one hook member suspended from said conveying means, at least one free trolley unit, engaging means on said trolley unit adapted to enter said hook member while in motion so as to suspend said trolley unit from said conveying means, track means positioned at points in the travel of said unit to carry the same at said points, rolling means on said trolley unit adapted to roll on said track means and thereby be supported thereon, the improvement which comprises a substantially C-shaped receiving means forming part of said hook member, having an opening accessible in the longitudinal direction of said conveying means and being adapted to receive said engaging means, a locking member pivotally mounted on said hook member to normally overlap and close said opening, said locking member being cam-shaped in such a manner that it will be displaced by being pivoted on and with respect to said hook member upon engagement with said engaging means at said points to give access to said opening and lockingly close it after said engaging means has entered said receiving means.

9. A free trolley conveyor system comprising in combination, an endless overhead conveyor moving continuously, a plurality of hook members, each having a C-shaped part with an opening accessible in the longitudinal direction of said conveying means, said hook members being suspended from said conveyor to move together therewith, coupling and decoupling stations along said conveyor, stationary track means at said stations, said track means being mounted substantially parallel with respect to said conveyor, a plurality of free trolleys having roller means adapted to run on said track means, suspension elements mounted on said trolleys, each of said elements having an engaging member adapted to be received by any of said hook members through said openings to be coupled with said hook members, said track means at said coupling stations being inclined to move said trolleys by gravity in the path of said hook members to cause said engaging members to enter said openings, cam-shaped locking means pivotally mounted on said hook members and biased to overlap and lock said openings after said engaging members have entered them, the cams of said locking means having such configuration that said engaging members can trip said locking means when entering said openings, arms on said locking means extending laterally with respect to said conveyor, and stationary abutment means at said decoupling stations adapted to strike said arms to unlock said openings by causing said locking means to pivot and thereby uncover said openings, when said hook members pass by said decoupling stations.

10. A free trolley conveyor system according to claim 9, wherein said track means at said decoupling stations are inclined to cause said free trolleys to be accelerated when running on said track means after being decoupled from said hook members.

11. A free trolley conveyor system according to claim 9, wherein said stationary abutment means constitute inclined rails positioned in the path of said arms, whereby said arms will ride on said rails at said decoupling stations to be lifted thereby causing unlocking of said locking means.

GEORGES REUSSNER.

REFERENCES CITED

The following references are of record in the file of this patent:

UNITED STATES PATENTS

| Number | Name | Date |
|---|---|---|
| 1,865,788 | Raymond | July 5, 1932 |
| 1,875,966 | Webb et al. | Sept. 6, 1932 |
| 1,921,109 | Webb et al. | Aug. 8, 1933 |
| 1,994,032 | Angerpointer | Mar. 12, 1935 |
| 2,040,353 | Wilson | May 12, 1936 |
| 2,234,620 | Botley | Mar. 11, 1941 |
| 2,344,155 | McBride et al. | Mar. 14, 1944 |

FOREIGN PATENTS

| Number | Country | Date |
|---|---|---|
| 208,752 | Great Britain | Dec. 31, 1923 |